United States Patent Office 3,459,804
Patented Aug. 5, 1969

3,459,804
TRIORGANOPHOSPHORANYLIDENEKETENES
Clifford N. Matthews, St. Louis, and Gail H. Birum, Kirkwood, Mo., assignors to Monsanto Company, St. Louis, Mo., a corporation of Delaware
No Drawing. Filed July 22, 1966, Ser. No. 567,066
Int. Cl. C07f 9/50
U.S. Cl. 260—585.5                    7 Claims

ABSTRACT OF THE DISCLOSURE

Triorganophosphoranylideneketenes, new compounds of the formula $R_3P=C=C=O$ wherein the R substituents are certain aromatic hydrocarbon radicals, are synthesized by decomposition of [(carboxy)(triorganophosphoranylidene)methyl]triorganophosphonium inner salts. Also disclosed are the sulfur and imine analogs of said ketenes and reaction of the ketenes or said analogs with organic mercaptans to yield 1:1 adducts. The triorganophosphoranylideneketenes have utility as insecticides and in flameproofing polymers.

In accordance with this invention there is provided compounds of the formula $$R_3P=C=C=Y \qquad (I)$$

wherein each R is selected from the group consisting of alkyl, aryl, haloaryl, haloaralkyl, alkaryl and aralkyl groups containing up to 20 carbon atoms and free of nonbenzoid unsaturation, and Y is selected from the group consisting of O, S, and RN, where R is as defined above.

Triorganophosphoranylideneketenes and their thio and imino analogs are formally related to ketenes, ylids and inner salts alkynes as represented by the following resonance structures.

$$R_3P=C=C=Y$$
$$\updownarrow$$
$$R_3\overset{\oplus}{P}-\overset{\ominus}{C}=C=Y$$
$$\updownarrow$$
$$R_3\overset{\oplus}{P}-C\equiv C-\overset{\ominus}{Y} \qquad (I)$$

For convenience the name triorganophosphoranylideneketene is used rather than a name based on ionic contributing structures such as those shown above.

Representative R organic radicals for the compounds of Formula I prepared by the processes of this invention include by way of example and not limitation alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl, and the various homologues and isomers of alkyl having from 1 to 20 carbon atoms; aryl such as phenyl, biphenyl, naphthyl, and the like; aralkyl such as benzyl, phenylethyl, diphenylmethyl, and the like; and alkaryl such as tolyl, ethylphenyl, xylyl, butylphenyl, tert-butylphenyl, trimethylphenyl, diethylphenyl, methylpropylethylphenyl and the like; haloaryl such as chlorophenyl, bromophenyl, iodophenyl, 2,4-dichlorophenyl, 2,4,6-tribromophenyl, 2,3,4,5,6-pentachlorophenyl and the like; and haloaralkyl such as chlorobenzyl, bromobenzyl, iodobenzyl, chlorophenylethyl, 2,4-dichlorophenylethyl, di(2,4-dichlorophenyl)methyl and the like. Within this class R radicals of not more than 12 carbon atoms containing from 0 to 5 halogen atoms are preferred. Preferably each R is aromatic consisting of phenyl or fused ring aromatic systems.

Illustrative of these phosphoranylideneketenes are the following $(CH_3)_3P=C=C=O$     $(CH_3)_3P=C=C=S$
$(C_4H_9)_3P=C=C=O$     $(C_4H_9)_3P=C=C=S$
$(C_6H_5)_3P=C=C=O$     $(C_6H_5)_3P=C=C=S$
$(CH_3C_6H_4)_3P=C=C=O$     $(CH_3C_6H_4)_3P=C=C=S$
$(C_{10}H_7)_3P=C=C=O$     $(C_{10}H_7)_3P=C=C=S$
$(C_6H_{11})_3P=C=C=O$     $(C_6H_{11})_3P=C=C=S$
$(C_{18}H_{37})_3P=C=C=O$     $(C_{18}H_{37})_3P=C=C=S$
$(C_6H_5CH_2)_3P=C=C=O$     $(C_6H_5CH_2)_3P=C=C=S$
$(CH_3)_3P=C=C=NC_6H_5$     $(C_6H_5)_3P=C=C=NCH_3$
$(C_6H_5)_3P=C=C=NC_6H_5$     $(C_6H_5)_3P=C=C=NC_6H_4Cl$ The compounds of this invention are readily obtained by the thermal decomposition of mesomeric phosphonium inner salts (II) as represented by the following general equation.

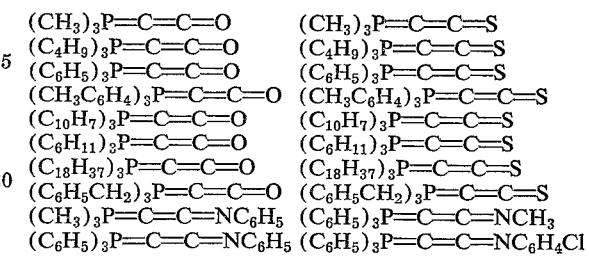

[Equation A]

where R and Y are as defined above and Z is O or S. The inner salts are disclosed in United States Patent 3,262,971 issued July 26, 1966, which is hereby incorporated into this application by reference. In said patent, the salts are named to emphasize the phosphorane portion of the molecule, rather than the phosphonium structure. Hence, in the said patent, Compound (II) above, wherein R is phenyl, is called triphenylphosphonium(carboxy)methylenetriphenylphosphorane, rather than [(carboxy)(trienetriphenylphosphorane, rather than [(carboxy)(triphenylphosphoranylidene)methyl]triphenylphosphonium inner salt as in the present instance. The thermal decomposition is preferably accomplished by heating a dispersion of the phosphonium inner salt in an inert liquid at a temperature of about 60 to about 180 degrees centigrade. It may also be preferable to heat the dispersion in the absence of moisture and oxygen, e.g., under an atmosphere of nitrogen.

Suitable inert dispersion media employed in this process include aromatic hydrocarbons and halogen-substituted aromatic hydrocarbons such as benzene, toluene, xylene and chlorobenzene; alkyl hydrocarbons such as heptane and dodecane; ethers such as dibutyl ether and bis(2-methoxyethyl)ether; and low melting solids, e.g., phosphate esters such as tricresyl or triphenyl phosphate.

When [(carboxy)(triphenylphosphoranylidene)methyl]triphenylphosphonium inner salt (III) is warmed in dry diglyme, decomposition occurs to yield a nearly equimolar mixture of triphenylphosphine oxide by product and triphenylphosphoranylideneketene according to the following equation.

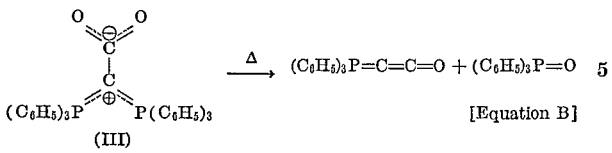

$$(C_6H_5)_3P=C=C=O + (C_6H_5)_3P=O$$ [Equation B]

(III)

The crude reaction mixture can be conveniently used in the synthesis of many derivatives since the by-product triphenylphosphine oxide is generally more readily separated from the derivatives than from the triphenylphosphoranylideneketene. The other products of this invention are conveniently processed in a similar fashion.

The separation of the desired phosphoranylideneketene from the reaction mixture is readily accomplished by conventional means well known in the art, e.g., fractional crystallization, chromatography, selective extraction or any suitable combination of these methods.

The triorganophosphoranylideneketenes of this invention when reacted with a mercaptan according to Equation C form useful β-ketoidenephosphoranes (IV).

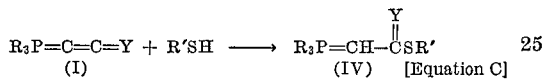

$$R_3P=C=C=Y + R'SH \longrightarrow R_3P=CH-\overset{Y}{\underset{\|}{C}}SR'$$
(I)                     (IV)   [Equation C]

wherein R and Y are as previously described and R' is independently selected from the same group as R. The reaction is conveniently carried out at a temperature from about zero to 100 degrees centigrade with ambient room temperature generally being satisfactory. These β-ketoidenephosphoranes are readily prepared by slowly passing an excess of gaseous mercaptan into the still dispersed reaction product mixture of Equation B.

The triorganophosphoranylideneketenes of this invention can be used as pest controlling agents, e.g., insecticides, textile auxiliaries, additives for petroleum products and means for flameproofing polymers, intermediates for other valuable compounds and the like.

The following examples further illustrate the invention. Parts and percent are by weight and all temperatures are degrees centigrade unless otherwise indicated.

EXAMPLE 1

When [(carboxy) (triphenylphosphoranylidene) methyl]triphenylphosphonium inner salt was stirred in dry diglyme under nitrogen and warmed at 140–145 degrees centigrade for 0.25 hour, a clear yellow solution results having two phosphorus NMR signals of about equal intensity at −3.6 p.p.m. and −23.4 p.p.m., the latter being characteristic of triphenylphosphine oxide in diglyme. A white powder, melting point 130–160 degrees, that precipitated on cooling showed strong infrared absorption at 4.74μ (cumulated double bond region) and at 8.38μ (P=O).

[Diphenylketene absorbs at 4.74μ, phenylacetylene at 4.70μ, and triphenylphosphine oxide at 8.38μ.] Repeated recrystallization from diglyme yielded white needles, triphenylphosphoranylideneketene, melting point 172–173.5 degrees; triphenylphosphine oxide, melting point 156–157 degrees, was isolated from the filtrates. Formula I was assigned to this stable, new compound on the basis of its method of formation, infrared spectrum [4.74μ (s.)], P$^{31}$ NMR spectrum (single peak at −2.6 p.p.m. in benzene at 40.5 mc.) and elemental analysis. *Analysis*.— Calcd. for $C_{20}H_{15}OP$: C, 79.44; H, 5.00; P, 10.24; mol wt. 302.3. Found: C, 79.51; H, 4.93; P, 10.20; mol wt., 298 (in CHCl$_3$). The monomeric nature was confirmed by X-ray diffraction studies.

EXAMPLE 2

Triphenylphosphoranylidenethioketene (VI), together with triphenylphosphine sulfide, was obtained by the analogous thermal decomposition of [(dithiocarboxy)-(triphenylphosphoranylidene) methyl] triphenylphosphonium inner salt (V) in dry diglyme under nitrogen at 120–130 degrees. Recrystallization of the mixture from benzene yielded light tan needles, triphenylphosphoranylidenethioketene, melting point 224–226 degrees,

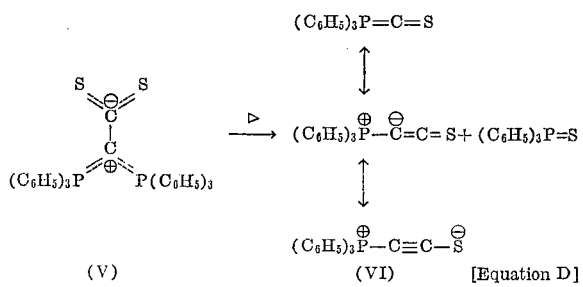

(V)                (VI)   [Equation D]

having infrared absorption bands at 4.73μ (m.) and 5.10μ (s.), and a single P$^{31}$ NMR peak at +7.7 p.p.m. (in CH$_2$Cl$_2$ at 24.3 mc.). *Analysis*.—Calcd. for $C_{20}H_{15}PS$: C, 75.43; H, 4.75; P, 9.73; S, 10.07; mol wt., 318.3. Found: C, 75.49; H, 4.68; P, 9.69; S, 10.06 mol wt., 315 (in CHCl$_3$).

EXAMPLE 3

Preparation of β-ketomethylmercaptoidenetriphenylphosphorane

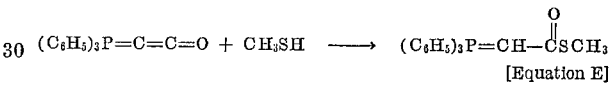

$$(C_6H_5)_3P=C=C=O + CH_3SH \longrightarrow (C_6H_5)_3P=CH-\overset{O}{\underset{\|}{C}}SCH_3$$
[Equation E]

A 4.0 g. portion of a mixture of $(C_6H_5)_3P=C=C=O$ and $(C_6H_5)_3P=O$, obtained by decomposition of [(carboxy) (triphenylphosphoranylidene) methyl] triphenylphosphonium inner salt (III) as in Example 1, was dissolved in 20 grams of diglyme and the solution stirred under nitrogen as gaseous methyl mercaptan was added below the surface for 0.5 of an hour. The reaction mixture was allowed to stand in the stoppered reaction flask for two hours, and then the solvent was evaporated to dryness. The residue was stirred with 15 ml. of methanol, filtered and the product washed with methanol to give 1.1 grams of white solid, melting point 209–218 degrees. Recrystallization from diglyme-benzene gave 0.7 gram of colorless crystals, melting point 212–219 degrees. The NMR spectra in CDCl$_3$ contained a P$^{31}$ signal at −13.2 p.p.m. and H$^1$ signals at −7.5 p.p.m. (center of an aryl multiplet), at −3.66 p.p.m., and at −2.23 p.p.m., the H$^1$ areas approximating the theoretical 15:1:3 ratio. The infrared spectrum showed strong carbonyl absorption at 6.3μ. *Analysis*.—Calcd. for $C_{21}H_{19}OPS$: C, 71.96; H, 5.46; P, 8.84; S, 9.15; molecular weight, 350.4. Found: C, 72.09; H, 5.45; P, 8.77; S, 9.17; molecular weight (in benzene), 360.

Example 3 exemplifies a general method for forming various β - ketoalkylmercaptoidenetriphenylphosphoranes. In general, β-ketoalkylidenetriphenylphosphoranes have been shown to be versatile synthetic intermediates, see H. J. Bestmann, Agnew Chem. Intl. Ed., vol. 4, 583, 645, 830 (1965) A. Maercker, "The Wittig Reaction," Organic Reactions, vol. 14, 270 (1965), and S. Trippett, "The Wittig Reaction," Quart. Reviews, vol. 17, 406 (1963).

EXAMPLES 4 to 19

In a manner similar to Examples 1 and 2 other compounds of the formula,

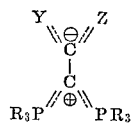

where Z is oxygen or sulfur, are thermally decomposed to provide other compounds of this invention having the general formula $R_3P=C=C=Y$. Results and further details are given below.

| Example | Product wherein R | Y |
|---|---|---|
| 4 | $CH_3$ | O |
| 5 | $(C_6H_5)_2CH$ | S |
| 6 | $CH_3C_6H_4$ | O |
| 7 | $C_6H_5CH_2$ | O |
| 8 | $C_4H_9$ | S |
| 9 | $C_{18}H_{37}$ | O |
| 10 | $C_{10}H_7$ | O |
| 11 | $C_6H_{11}$ | O |
| 12 | $C_6H_{11}$ | S |
| 13 | $C_4H_9$ | O |
| 14 | $(C_6H_5)_2CH$ | O |
| 15 | $CH_3C_6H_4$ | S |
| 16 | $C_{18}H_{37}$ | S |
| 17 | $C_{10}H_9$ | S |
| 18 | $C_6H_4Cl$ | $NCH_3$ |
| 19 | $CH_3$ | $NC_6H_5$ |

The foregoing examples and methods have been described in the foregoing specification for the purpose of illustration and not limitation. Many other modifications and ramifications will naturally suggest themselves to those skilled in the art based on this disclosure. These are intended to be comprehended within the scope of this invention.

Having thus described our invention, what we desire to claim and secure by Letters Patent is:

1. Compounds of the formula $R_3P=C=C=Y$ wherein each R is an aromatic hydrocarbon radical of up to 20 carbon atoms and free of non-benzoid unsaturation, and Y is selected from the group consisting of O and S.

2. Compounds according to claim 1 wherein Y is O.
3. Compounds according to claim 1 wherein Y is S.
4. Compounds according to claim 1 wherein R is phenyl.
5. Triphenylphosphoranylideneketene of the formula $(C_6H_5)_3P=C=C=O$.
6. Triphenylphosphoranylidenethioketene of the formula $(C_6H_5)_3P=C=C=S$.
7. A process for preparing the compounds according to claim 1 comprising thermally decomposing, at a temperature of 60–180° C., a mesomeric phosphonium salt of the formula

wherein each R is an aromatic hydrocarbon radical of up to 20 carbon atoms and Y and Z are selected from the class consisting of O and S.

References Cited

UNITED STATES PATENTS 2,912,467  11/1959  Gerecke.

BERNARD HELFIN, Primary Examiner

MATHEW M. JACOB, Assistant Examiner

U.S. Cl. X.R.

252—8; 260—455; 566, 606, 999

UNITED STATES PATENT OFFICE
CERTIFICATE OF CORRECTION

Patent No. 3,459,804  Dated August 5, 1969

Inventor(s) Clifford N. Matthews et al

It is certified that error appears in the above-identified patent and that said Letters Patent are hereby corrected as shown below:

Column 2, delete line 47, as it was repeated in line 48.

Column 4, line 5 (first line of Equation D), "$(C_6H_5)_3P=C=S$" should be -- $(C_6H_5)_3P=C=C=S$ --.

Signed and sealed this 12th day of October 1971.

(SEAL)
Attest:

EDWARD M. FLETCHER, JR.
Attesting Officer

ROBERT GOTTSCHALK
Acting Commissioner of Patents